May 27, 1924.
W. B. MURRAY
TRAIN CONTROL SYSTEM
Filed April 21, 1922     4 Sheets-Sheet 3
1,495,562
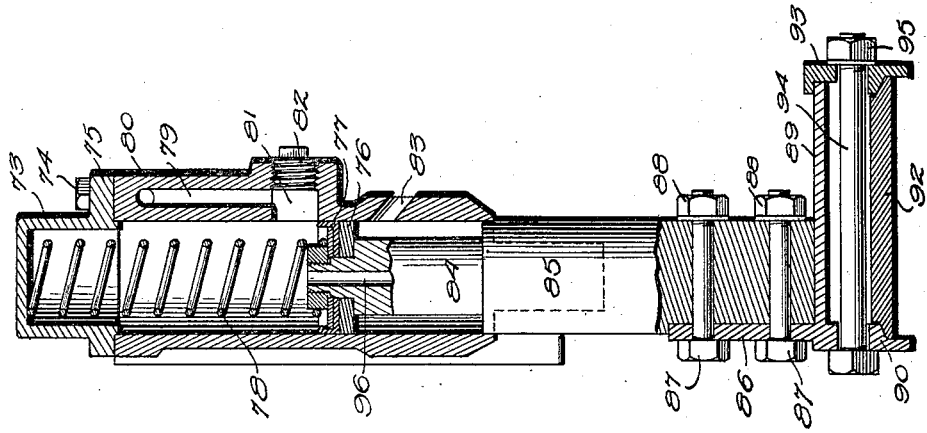
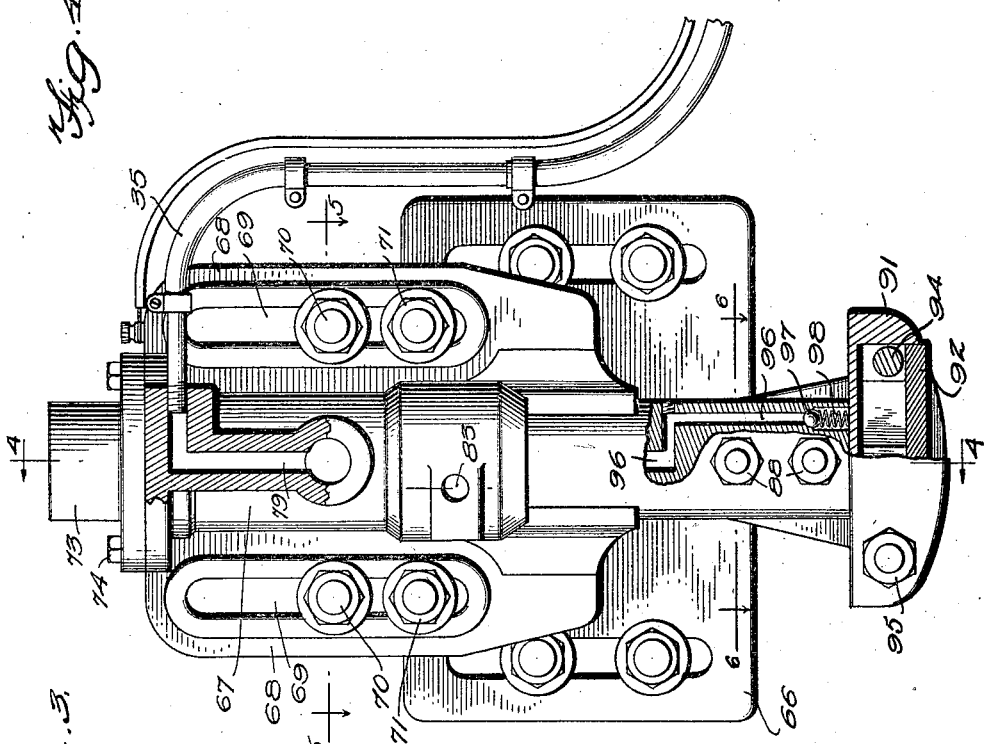
Inventor
William B. Murray
By
Attorney May 27, 1924.
W. B. MURRAY
TRAIN CONTROL SYSTEM
Filed April 21, 1922 4 Sheets-Sheet 4
1,495,562
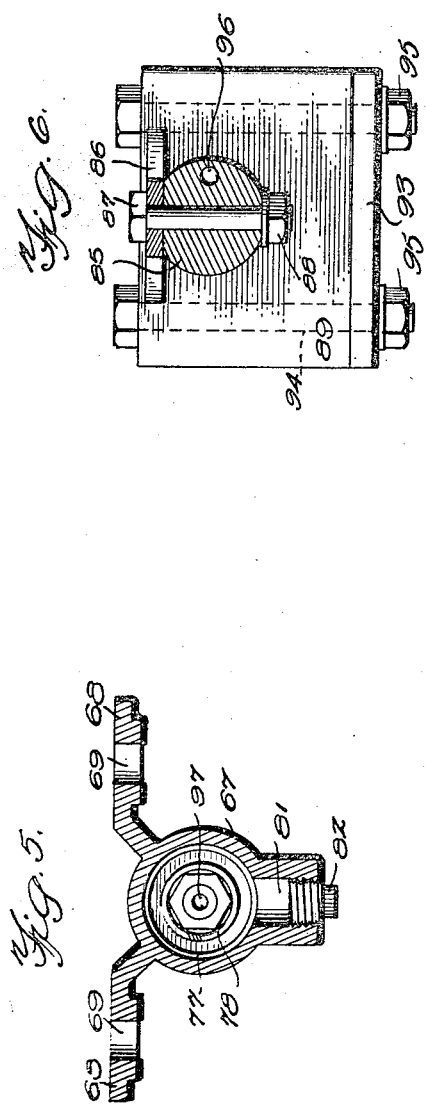
Inventor
William B. Murray
By
Attorney Patented May 27, 1924.

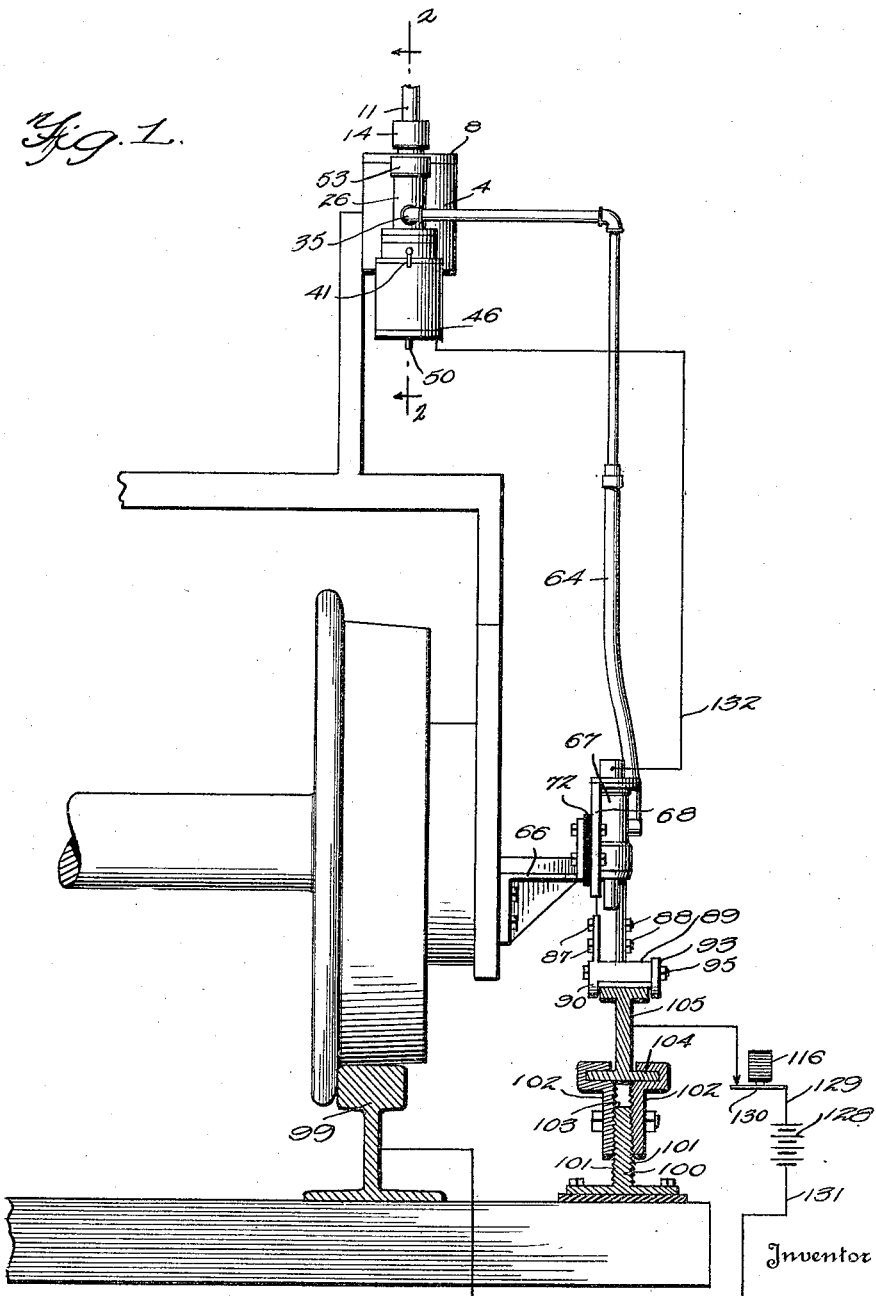

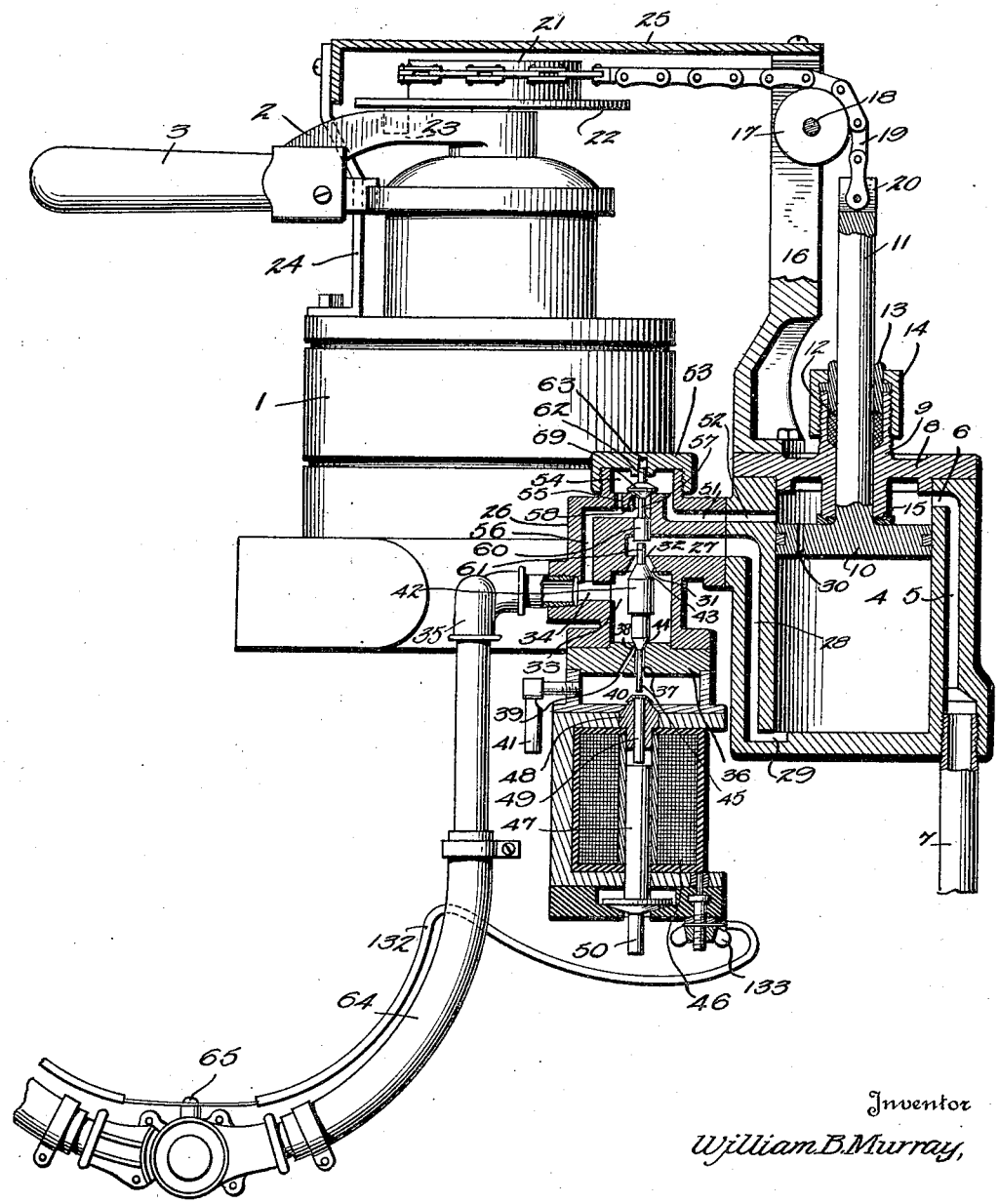

1,495,562

UNITED STATES PATENT OFFICE.

WILLIAM BROOKS MURRAY, OF DANVILLE, ILLINOIS, ASSIGNOR TO THE MILLER TRAIN CONTROL CORPORATION, OF STAUNTON, VIRGINIA, A CORPORATION OF VIRGINIA.

TRAIN-CONTROL SYSTEM.

Application filed April 21, 1922. Serial No. 555,854.

*To all whom it may concern:*

Be it known that I, WILLIAM B. MURRAY, a citizen of the United States, residing at Danville, in the county of Vermilion and State of Illinois, have invented certain new and useful Improvements in Train-Control Systems, of which the following is a specification.

This invention relates to train control systems, wherein mechanically actuated and electrically controlled vehicle stopping apparatus is carried by a vehicle adapted to travel upon a track and is operated by ramps adjacent the track and having electric circuits associated therewith. The invention disclosed and claimed in the present application is an improvement over the systems shown in my prior Patents Nos. 1,337,255, granted April 4, 1920, and 1,396,870, granted November 15, 1921, wherein the apparatus controlling the vehicle contacts with ramps arranged at suitable locations along the track way, and the vehicle is stopped if the ramp is deenergized and allowed to proceed when it passes an energized ramp.

An object of the present invention is the provision of an electrically controlled main valve which seats upwardly against a current of air flowing downwardly, whereby the valve is positively removed from its seat when its control magnet is deenergized.

A further object is the provision of an auxiliary valve opened by the closure of the main valve to refill the pipes forming a part of the system to prevent a reduction of pressure in the control apparatus when the main valve opens.

In the accompanying drawings, I have shown one embodiment of the invention. In this showing:

Figure 1 is a diagrammatic side elevation showing the invention applied to a vehicle, Figure 2 is a front elevation of an engineer's air brake lever showing the invention applied, parts being shown in section, Figure 3 is a front elevation of a shoe adapted to engage the ramp, parts being shown in section, Figure 4 is a vertical sectional view on line 4—4 of Figure 3, Figure 5 is a transverse sectional view on line 5—5 of Figure 3, Figure 6 is a similar view on line 6—6 of Figure 3, and, Figure 7 is a diagrammatic view of a portion of a track way showing the electric circuits.

Referring to the drawings, the reference numeral 1 designates the casing of an engineer's air brake valve of usual construction which is mounted on the vehicle at any suitable point, preferably in the engineer's cab. A shaft (not shown) extends through this casing and is provided with a lever 2 to permit revolution of the shaft to open or close the valve and apply the brakes. This lever is provided with a handle portion 3. The control apparatus forming the subject matter of the present invention consists of a cylinder 4 which is closed at its lower end and is provided with a port 5 for the introduction of air or other fluid under pressure. As shown, this port communicates with the top of the cylinder through a transverse port 6. These ports are adapted to be connected to a source of fluid under pressure, such as the air reservoir of the vehicle, by means of a pipe 7. The upper end of the cylinder is closed by a head 8, which is provided with a central boss 9. A piston 10 is arranged within the cylinder and this piston is provided with a piston rod 11, extending through the boss 9. The piston rod is adapted to be surrounded by suitable packing 12, held in position by a packing gland 13 and a packing nut 14, which engages threads formed on the exterior of the boss 9. The inner end of the boss is surrounded by a suitable strip of packing 15. A bracket 16 is supported on the top of the cylinder and this bracket is adapted to support a steel roller 17, mounted on a pin 18. A chain 19 preferably formed of steel, is connected to the piston rod. The chain may be connected to the piston rod in any suitable manner but, as shown, the piston rod is provided with a longitudinal slot 20 at its upper end and one end of the chain is arranged therein and adapted to be maintained in position by means of rivets or other suitable fastening elements. A drum 21 is secured to the shaft of the air brake valve and the other end of the chain is adapted to be secured to this drum. The drum is provided with a flange 22 forming a guide or guard for the chain and is further provided with a depending lug or pin 23, adapted to engage one side of the air brake lever. A bracket 24 is secured to the casing of the air brake valve and extends upwardly. This bracket and the bracket 16 are adapted to receive and support a cover plate 25 arranged over the chain.

A valve casing 26 is arranged adjacent the cylinder 4. This valve casing is provided with a main inlet passage 27 communicating with a port 28 extending through the cylinder wall to the bottom and this port communicates with the interior of the cylinder by a passage 29. The piston is provided with a restricted port 30, whereby the lower portion of the cylinder communicates with the upper portion to establish a balanced pressure therein. The valve casing is provided with a main valve seat 31, arranged in a port 32, connecting the main inlet passage to a chamber 33. This chamber is provided with an outlet 34 communicating with a pipe or conduit 35. The bottom of the chamber is closed by a plate 36, having an opening 37 arranged therein. The upper end of this opening is provided with a valve seat 38 and a port 39 extends from the valve seat to a secondary chamber 40. A whistle 41 is arranged on the valve casing, communicating with a secondary chamber 40. A valve member 42 is arranged in the chamber 33 and is provided with a valve 43, adapted to engage the valve seat 31. The lower end of this member is provided with a valve 44, adapted to engage the valve seat 38 and a valve stem 45 extends from the valve 44 through the opening 36. The main valve 43 is normally in the open position, shown in Figure 2 of the drawings, and is adapted to be controlled by a magnet 46. As shown, this magnet is provided with a core 47, which is raised when the magnet is energized. A guide 48 is supported in the upper portion of the magnet and a pin 49 extends through this guide. When the core of the magnet is raised, this pin is lifted to engage the valve stem 45 and close the valve 43. The core of the magnet is provided with an extension 50, projecting from the bottom of the magnet casing to permit manual operation of the valves.

The upper end of the valve casing 26 is provided with a port 51, communicating with a transverse port 52 in the top of the cylinder. The valve casing is closed by a cap 53, the interior of which is hollow, forming an auxiliary chamber 54. This chamber is provided with a small bleed opening 55, communicating with a port 56 that extends into the main outlet port 34 and thus communicates with the conduit or pipe 35. The port 56 extends inwardly beyond the bleed opening 55 and communicates with a passage 57 extending into the chamber 54. The upper end of this passage is provided with a valve seat 58. A valve 59 is normally in engagement with this valve seat. The valve is provided with a depending stem 60 which projects into the inlet passage 21 and is adapted to be engaged by an extension 61 of the main valve when the main valve is raised. The upper end of the valve 59 is provided with an extension 62 which is received in a recess 63 of the cap. The conduit 35 communicates with a shoe arranged on the locomotive at any convenient point and adapted to engage inclined ramps arranged at spaced intervals along the track and adapted to open the lower end of the pipe to the atmosphere. As shown, the conduit may be provided with sections of hose 64 or other flexible material to permit ease of assembly, these sections being connected to each other by couplings 65 of any desired type. The shoe is mounted on a bracket 66, secured to a part of the vehicle and arranged relatively close to the ground. As shown, the shoe comprises a substantially cylindrical member 67 having flanges 68 formed on opposite sides. These flanges are provided with slots 69 to permit vertical adjustment of the shoe in assembling. Bolts 70 pass through these slots and are received in openings in the bracket 66. These bolts are retained in position by means of nuts 71. As shown, suitable insulation 72 is arranged between the shoe and the bracket to insulate it from the vehicle. The shoe is provided with a removable cap 73 which is retained in position by bolts 74, passing through a flange 75 formed on the bottom of the cap and adapted to be received in openings in the body portion of the shoe. A piston 76 is arranged within the shoe, the piston being provided with suitable packing 77 to prevent leakage of air. A spring 78 is arranged between the top of the piston and the cap. The conduit 35 communicates with a port 79, arranged in an enlargement 80 on the front of the shoe. This port communicates with the interior of the shoe by means of a transverse chamber 81. As shown, the end of this chamber is closed by a threaded plug 82. The shoe is further provided with an outlet opening 83.

The piston is provided with a piston rod, the upper portion 84 of which is of less diameter than the diameter of the cylinder 67, and the lower portion 85 of which is of a diameter substantially equal to the diameter of the cylinder. As shown, this enlarged portion of the piston extends above the bottom of the cylinder at all times when the shoe is in its lowest position, as shown in Figure 4 of the drawings. The section 85 extends downwardly and is adapted to receive a substantially L-shaped plate 86. As shown, this plate is secured thereto by means of bolts 87 and nuts 88. The lower portion 89 of the plate is arranged horizontally. This plate is provided with a flange 90, at one end, and with flanges 91 on opposite sides. A shoe 92 formed of suitable hard metal is arranged beneath the plate 89 and between the flanges 90 and 91. A removable plate 93 is arranged opposite the flange 90 and bolts 94 are passed through the shoe to retain the insert plate 92 in position. These bolts are provided with nuts 95. The piston is provided with a longitudinal port 96, extending downwardly from the top and a ball valve 97 is arranged adjacent the bottom of this port. The ball valve is normally retained in position by a spring 98.

Referring to Figure 1 of the drawings, a ramp is adapted to be arranged opposite the rail 99 at the point where the train stopping apparatus is adapted to function. As shown, the ramp comprises an I-beam 100, the vertical portion of which is provided with serrated edges 101. A pair of clamping plates 102 are secured to this beam, these plates being provided with serrated inner edges 103. The upper edges of these plates are provided with clamping elements 104, adapted to receive the bottom of an I-beam 105 which forms the contact member of the ramp. The ramp may be vertically adjusted to any desired height and is inclined from each end to the middle in the usual manner.

In Figure 7 of the drawings, the arrangement of the ramps and the connections to form the necessary circuits is diagrammatically illustrated. As shown, the trackway is formed of a plurality of rails in the usual manner and the rail sections are separated by insulated joints 106 to form blocks A, B, and C. The signal is arranged at the entrance to each block, in the usual manner, adapted to be controlled by the track circuit and this signal is connected to a ramp arranged at braking distance in front of the entrance to the block to control the train. As shown, a track circuit is formed by means of lead wires 107 and 108, which are connected to the two rails of the track and to a source of current 109. A track relay 110 is also connected to the rails by lead wires 111 and 112. It will be apparent that a circuit normally exists in the block C when there is no train in the block or no disconnected rails, opened switches, or other breaks in the track which would form a break in the circuit. The track relay 110 is adapted to control a signal circuit which includes a source of current 113. As shown, signal wires 114 and 115 extend along the track and the source of current 113 is connected to the wire 114 by a lead wire 115. The wire 114 serves as a ramp control wire and is connected to ramp relay 116 by a branch wire 117. The relay is provided with a lead wire 118 which is connected to a movable contact 119 arranged adjacent the track relay and adapted to be influenced by the track relay. The contact 119 is adapted to engage a lead wire 120 which is connected to a signal relay 121. A movable arm 122 is arranged adjacent this relay and this arm is connected to a pivoted signal 123 by means of suitable connections 124. When the arm 122 is attracted by an energized relay, the signal is maintained in the upper or clear position, as shown in full lines in Figure 3 of the drawings. When the relay is deenergized, a spring 125 is adapted to swing the lever on its pivot and lower the signal to a danger or stopping position, shown in dotted lines. The relay is connected to wire 115 by a wire 126 and the wire 115 is connected to the source of current by a wire 127.

The ramp 105 is arranged in advance of the entrance to block C, and this ramp is connected to a source of current 128 by means of a wire 129. A movable contact 130 is arranged in this connection and is adapted to be controlled by ramp relay 116. The opposite side of the source of current is connected to one of the rails by a wire 131. Referring to Figures 1 and 2 of the drawings, the shoe is provided with a connection 132, which may extend upwardly along the conduit 35 and is connected to the electromagnet, as at 133, the opposite pole of the magnet being grounded on the vehicle.

In operation, air flows through the pipes 7 and ports 5 and 6 to the cylinder 4. Sufficient air passes through the restricted port 30 in the cylinder 10 to equalize the pressure on the top and bottom of the cylinder and the conduit 35 is filled with air passing through the ports 28 and 29, 51 and 52. The apparatus is then in condition for operation, the valve 43 being normally in the open position shown in Figure 2 of the drawings. As the vehicle approaches a block, the movable portion of the shoe engages a ramp and is raised, lifting the piston above the chamber 81 and permitting air to flow from the chamber 81 to the atmosphere, through opening 83. If the ramp is deenergized, indicating a danger condition, the magnet 46 remains deenergized and the valve 43 remains open, permitting air to flow from the bottom of the cylinder 10 to the conduit 35, thus reducing the pressure in the lower portion of the cylinder 4. The piston 10 is then forced downwardly, by the pressure on its upper surface, pulling the chain 19 downwardly and revolving the chain drum 21. The finger 23 engages the air brake lever 2 and moves it around to apply the brakes. As soon as the shoe passes off of the ramp, the pressure in the cylinder is equalized and the piston again raises, permitting the chain and chain drum 21 to assume their normal positions and thus permitting manual operation of the control lever 2, through the handle 3. This permits the engineer to release the brakes before the train comes to a dead stop or if the tracks are slippery and the brakes have been applied suddenly, locking the wheels and causing skidding, it permits the engineer to release the brakes and again apply them.

When the train approaches a clear signal, the ramp 105 is energized and the shoe picks up current which is conveyed to the magnet 46 through the lead wire 132, energizing the magnet. The complete circuit is indicated in Figure 1 of the drawings, the current passing through the vehicle to the rail 99 and thence to a source of current 128, through the wire 131. When the magnet is energized, the core 47 is raised, raising the pin 49 which contacts with the lower end 45 of the valve member 42, and raises valve 43 into engagement with the valve seat 41. This cuts off communication between the lower end of the cylinder and the conduit 35 and the raising of the movable portion of the shoe merely exhausts the air in the conduit 35 without applying the brakes. When the valve 43 is closed, the valve 44 is opened, permitting air to pass through the chamber 40 to the whistle 41, thus giving the engineer an audible signal that the block is clear, in addition to the usual visible signal. The conduit 35 is at all times in communication with the source of pressure through bleed opening 55 and passage 56 to maintain a constant pressure throughout the system and replenish any air lost by slight leaks at couplings or joints. However, an actual break in the hose will quickly exhaust the air at a greater speed than it can be replenished through the restricted bleed opening and will withdraw air from the bottom of the cylinder. It will thus be seen that the valve 43 is normally in danger position and that a positive action, the energization of the magnet 46, is necessary to permit the vehicle to pass a ramp, and further, that any break in the apparatus will also cause an application of the brakes. When the valve 43 is closed, the projection 61 engages the stem 60 of valve 59 to lift it from its seat. This permits a larger amount of air to flow to the conduit 35 than normally flows through the bleed opening 55. It will be apparent that a portion of the air in the conduit and shoe is exhausted each time the vehicle passes a ramp and in order to quickly replenish the supply and build up an equal pressure in the conduit, the auxiliary valve 59 is opened each time the vehicle passes an energized ramp by the closing of the main valve 43. This prevents air from being withdrawn from the lower portion of the cylinder when the valve 43 is again opened and thus removes the possibility of an ordinary application of the brakes due to a low pressure in the conduit 35 and a consequent decrease in pressure in the bottom of the cylinder.

The signalling mechanism disclosed is of the usual type. The entrance to each block is provided with signalling mechanism, as shown, and each block or track cut is provided with a track circuit. For simplicity, the track circuit of block C alone is shown in the drawings. With a clear block and no open switches, broken rails or other disconnections, current normally flows from source of current 109, through wire 107, one rail 99, wire 112, relay 110, wire 111, the other rail, and wire 108 to the source of current. Thus the track relay 110 is normally energized when a clear block exists. If a train enters the block, the current is short circuited through the wheels, and axle of the train, deenergizing the magnet. The contact 119 of the signal circuit then moves out of engagement with the lead wire 120 and the signal drops to the danger or stop position, shown in dotted lines in Figure 7 of the drawings. When the relay 110 is energized, current flows from the source of current 113, through wires 115, 114, and 117, ramp relay 116, wire 118, movable contact 119, wire 120, relay 121, wire 126, wire 115' and wire 127 to source of current 113. The signal relay 121 being energized, attracts the lever 122 against the tension of spring 125 and retains the signal 123 in clear position.

When the signal is in clear position, the ramp relay 116 is energized, attracting the contact 130 and connecting the ramp 105 to source of current 128 by means of wire 129. The opposite end of the source of current is connected to one of the rails by wire 131 and when a vehicle passes over the ramp, the contact between the plate 92 and the ramp causes the current to pass through the shoe to wire 132, magnet 46, the frame of the vehicle, rail 99, and wire 131 to the source of current. When the signal circuit is deenergized and the signal 123 is arranged at a danger position, the ramp relay 116 is deenergized and the contact 130 moves to open position disengaging the ramp from the source of current.

The shoe is forced downwardly by the pressure existing in the upper portion of cylinder 67, insuring proper contact between the shoe and the ramp to permit the shoe to pick up current from an energized ramp. The passage 96 extends through the top of the piston and is thus in communication with the conduit 35 at all times. The lower end of this passage is closed by ball valve 97 which is retained in position by spring 98, the opposite end of the spring bearing against plate 89 of the shoe. If the shoe proper should become loosened or broken off, it will be apparent that the ball valve 97 will be unseated and will thus permit the air to exhaust from the apparatus and apply the brakes.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a train control apparatus, a cylinder, a piston mounted therein, means for supplying fluid to one end of said cylinder, means to permit fluid to pass into the opposite end of the cylinder to establish a balanced pressure therein, the second end of said cylinder being provided with an outlet, said outlet communicating with the interior of said cylinder, a valve casing communicating with the opposite end of the outlet, a valve arranged therein, electrically operated means to actuate said valve, a conduit connected to the valve casing on the other side of said valve, mechanically actuated means to open said conduit to the atmosphere, and means for supplying additional air to said conduit when said valve is closed.

2. In a train control apparatus, a cylinder, a piston mounted therein, means for supplying fluid to one end of said cylinder, means to permit fluid to pass into the opposite end of the cylinder to establish a balanced pressure therein, the second end of said cylinder being provided with an outlet, said outlet communicating with the interior of said cylinder, a valve casing communicating with the opposite end of the outlet, a valve arranged therein, electrically operated means to actuate said valve, a conduit connected to the valve casing on the other side of said valve, mechanically actuated means to open said conduit to the atmosphere, and an auxiliary valve for supplying additional air to said conduit when said first valve is closed.

3. In a train control apparatus, a cylinder, a piston mounted therein, means for supplying fluid to one end of said cylinder, said piston being provided with a contracted port to establish a balanced pressure on both sides of said piston, the opposite end of said cylinder being provided with an outlet, a valve casing communicating with said outlet, a main valve arranged therein, electrically operated means to actuate said valve, a conduit connected to said casing, on the other side of said valve, a secondary valve arranged in said conduit, mechanically actuated means to operate said secondary valve, and an auxiliary valve for supplying additional air to said conduit when said main valve is closed and said auxiliary valve opened, said auxiliary valve being provided with a valve stem adapted to engage said main valve to open said auxiliary valve.

4. In a train control apparatus, means for applying the engineer's air brake, said means being controlled by fluid pressure, a valve casing arranged adjacent said means and communicating therewith, a main valve arranged in said casing, said casing being provided with an inlet opening above said valve and an outlet opening below said valve, a conduit connected to said outlet opening, a secondary valve arranged in said conduit, electrically operated means to close said main valve, and mechanically operated means to actuate said secondary valve.

5. A device constructed in accordance with claim 4, wherein said valve casing is provided with an auxiliary valve adapted to be opened by the closing of said main valve to supply air to said conduit.

6. A device constructed in accordance with claim 5, wherein said auxiliary valve is arranged above said main valve and provided with a depending stem adapted to be engaged by a portion of the main valve when the main valve is closed.

In testimony whereof I affix my signature in presence of two witnesses.

WILLIAM BROOKS MURRAY.

Witnesses:
J. A. FOSTER,
G. ROSS WERTZ.